[72] Inventors James John Drage; Norbert Kitz, both of Middlesex, England

[21] Appl. No. 844,920
[22] Filed July 25, 1969
[45] Patented Dec. 21, 1971
[73] Assignee Bell Punch Company Limited London, England
[32] Priority Feb. 17, 1969
[33] Great Britain
[31] 8,576/69

[54] CALCULATING MACHINES WITH A CONSTANT FUNCTION KEY
12 Claims, 15 Drawing Figs.

[52] U.S. Cl. .......... 235/159, 235/160, 235/168
[51] Int. Cl. .......... G06f 3/02
[50] Field of Search .......... 235/159, 160, 168

[56] References Cited

UNITED STATES PATENTS

| | | | |
|---|---|---|---|
| 3,280,315 | 10/1966 | Kitz .......... | 235/160 |
| 3,308,280 | 3/1967 | Crowther et al. .......... | 235/160 |
| 3,358,125 | 12/1967 | Rinaldi .......... | 235/160 X |
| 3,375,356 | 3/1968 | Scuitto et al. .......... | 235/160 |
| 3,391,391 | 7/1968 | Simpson, Sr. .......... | 235/159 X |

*Primary Examiner*—Charles E. Atkinson
*Attorney*—Laurence R. Brown

ABSTRACT: There is disclosed electronic calculating machine with at least two registers for storing numbers and transferring them between registers. The numbers are read by a sequence of ten pulses for each of the digits of a number which provide output pulses as the register digit stages become zero. Transfer of data between the registers is effected by means of gates which receive the output pulses and further control signals. The gates are controlled by a function control circuit with a constant function key which will enable the number to be held in the register and prevent a new number from being entered.

INVENTORS
Norbert Kitz
James J. Drage
By Laurence R. Brown
Attorney

CALCULATING MACHINES WITH A CONSTANT FUNCTION KEY

This invention has reference to calculating machines and has particular reference to calculating machines having at least two registers. Such a register comprises a plurality of register stages, each register stage serving to store a digit number representative of the train of digit pulses applied to it.

It is an object of the present invention to provide an improved system embodying certain circuits whereby a number in one register can be transferred to another register and vice versa.

Another object of the present invention is to provide a calculating machine having circuits whereby a number in one register can be copied into another register.

According to one aspect of the present invention there is provided a calculating machine having a circuit system for transferring a number stored in a first register into a second register, which circuit system comprises a pulse generator for supplying trains of 10 pulses into the respective stages of the first and second register through respective gates, the gates of the register having outputs which are energized as a digit stored in the register stage becomes zero, which said energizable outputs control gates to the input of the stages of the other register to allow or prevent passage of pulses from an energized output, and wherein the gates are also controlled by a function control operated under the control of a function switch on the calculating machine.

According to another aspect of the invention there is provided a calculating machine including a first register and a second register, the registers having a plurality of digit stages, a means for storing a digit, a first means for entering a digit representative of the digit stored in a stage of the first register into the storage means, a second means for entering into the cleared stage of the second register a digit representative of the digit stored in the storage means, and a control means for controlling the operation of the first-entering-means, the storage means and the second-entering-means; when the control means is operated, a representative digit is entered into the storage means from a stage of the first register to the storage means and a digit representative of the digit stored in the storage means is entered into a stage of the second register.

A constructional embodiment made in accordance with the invention will now be described, by way of example with reference to the accompanying drawings wherein:

FIGS. 1 and 1*a* show a block diagram of part of an electronic calculating machine made according to the invention;

Figure 1:
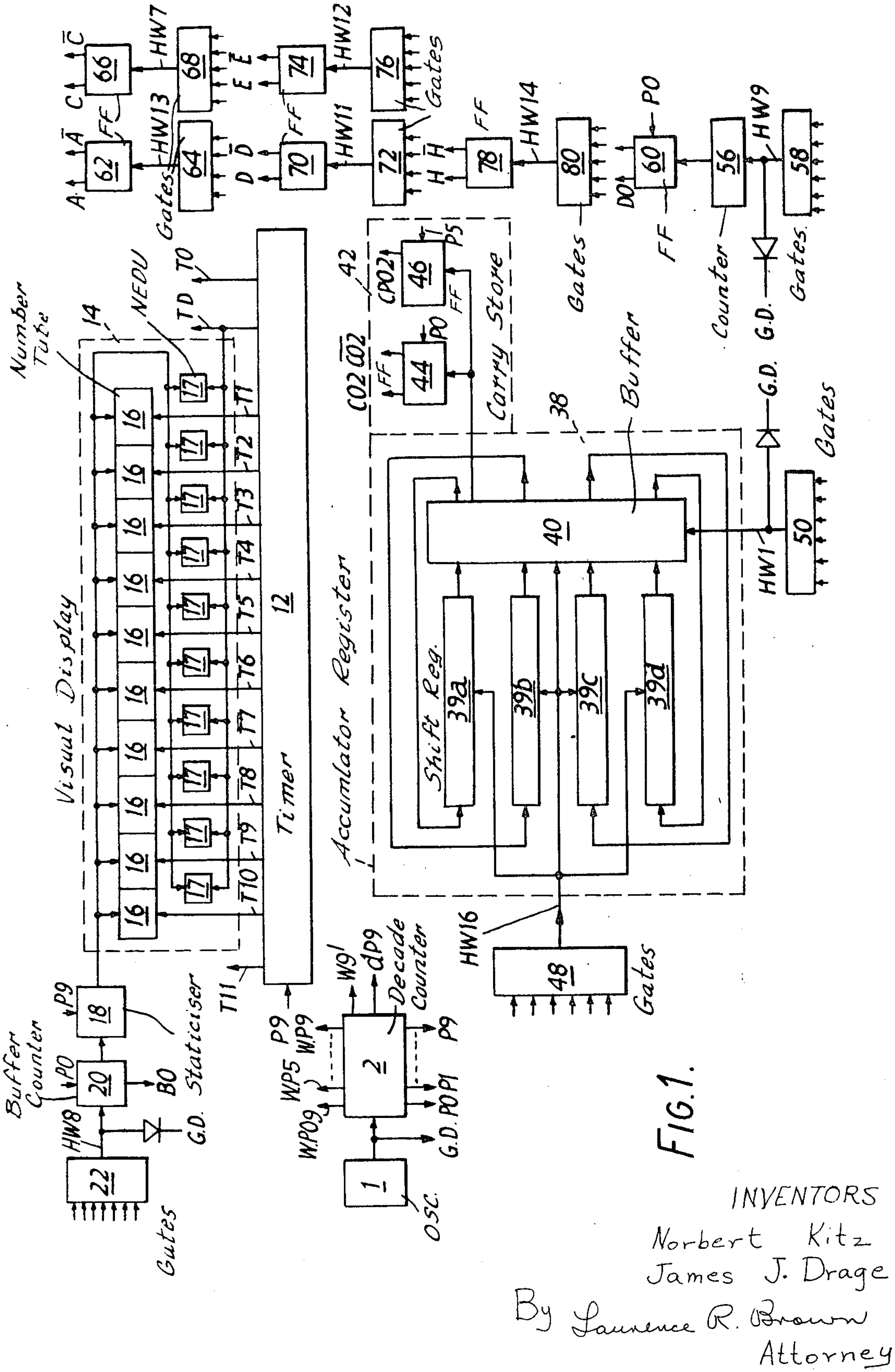
Figure 1A:
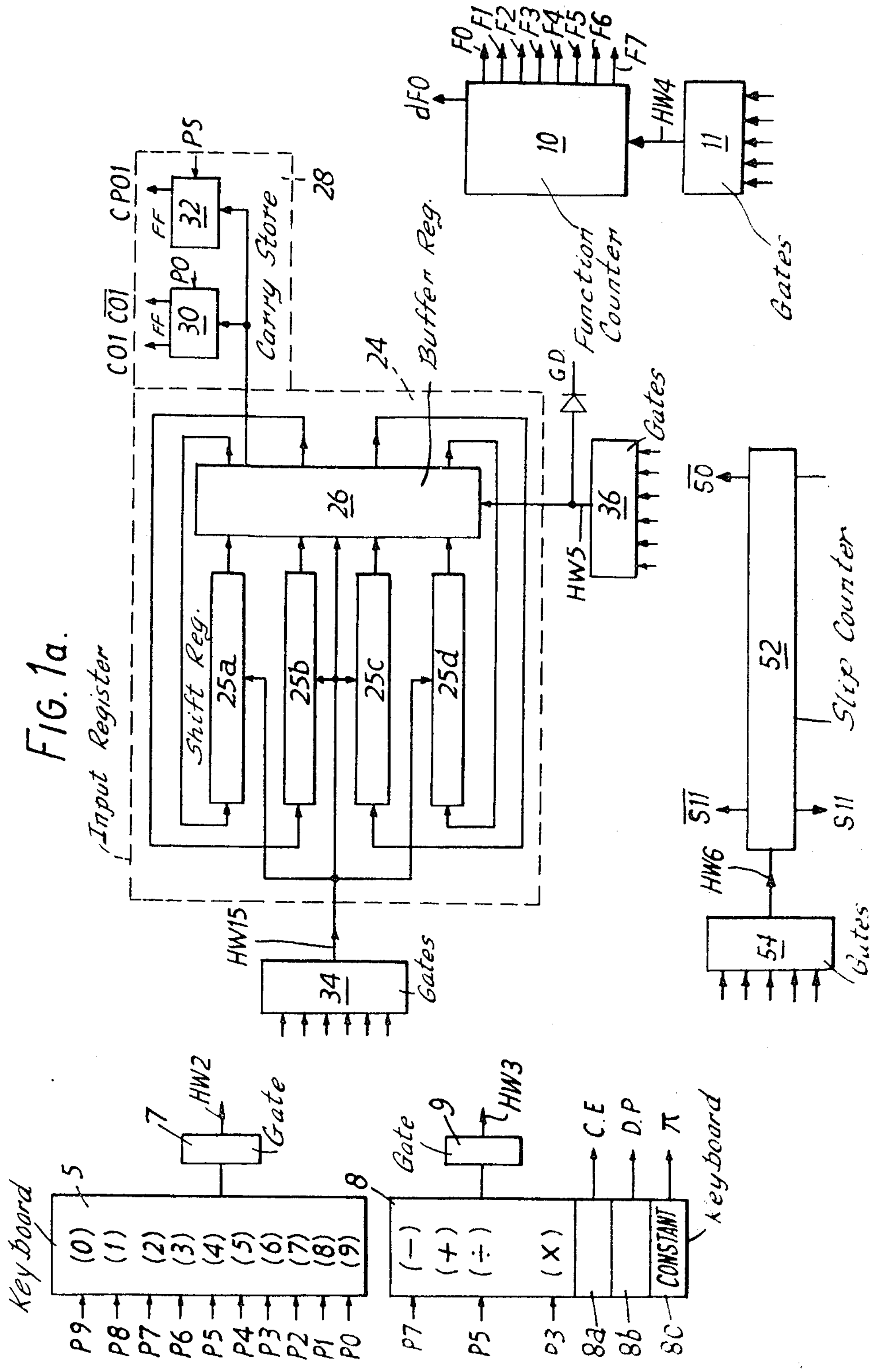
Figure 12:
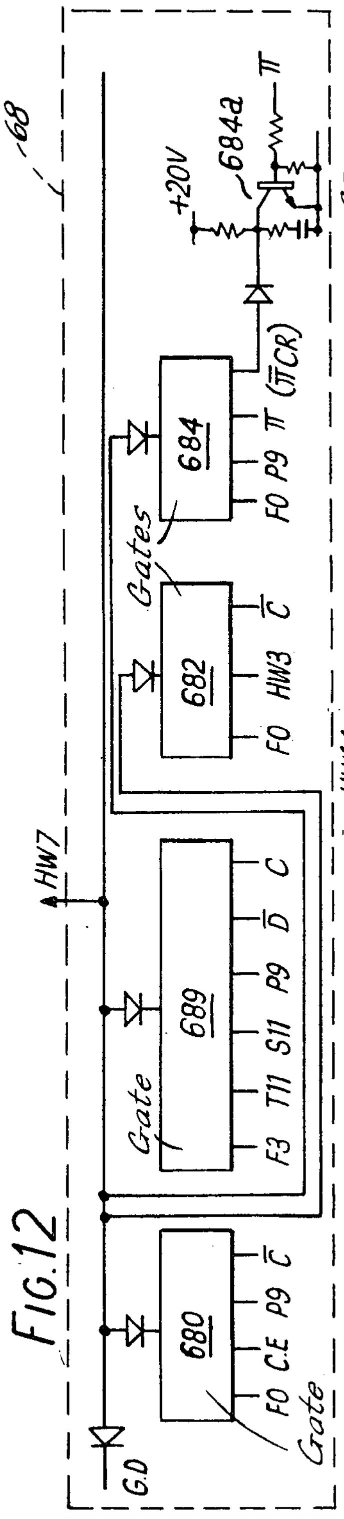
Figure 13:
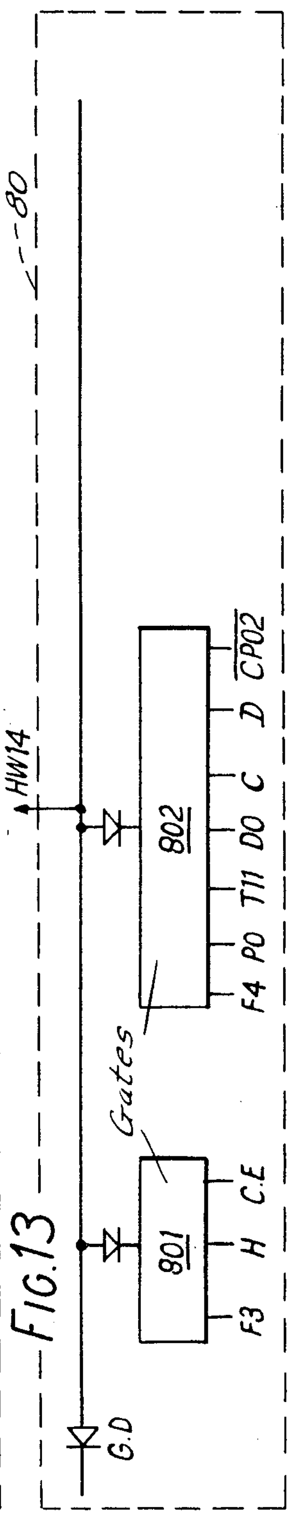
Figure 14:
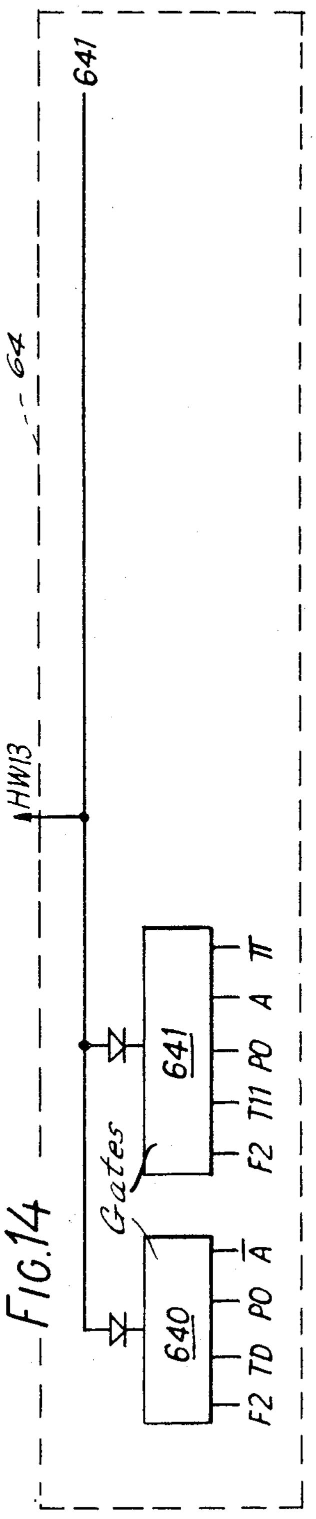

FIG. 12 shows part of the set of gates 68 shown in FIG. 1 in greater detail; and FIG. 13 shows part of the set of gates 80 shown in FIG. 1 in greater detail; and FIG. 14 shows part of the set of gates 64 shown in FIG. 1 in greater detail;

The FIG. 1 shows an electronic calculating machine made according to the present invention. In FIG. 1 a master oscillator 1 generates free-running oscillator pulses GD which are 'on' at +12 v. and 'off' at 0 v. The oscillator 1 is connected to an input decade 2 which is connected as a Johnson ring circuit. The input decade 2 divides the master oscillator pulses GD into sequential groups of 10 pulses, viz PO, P1, P2, P3, P4, P5, P6, P7, P8 and P9.

The output pulses P0 to P9 from the input decade 2 are internally gated to give waveforms P0, P5 and P9, a waveform $9^1$, and a waveform *d*P9.

"Waveform P0" is up (at +12 volt) from the back edge of the P9 pulse to the back edge of the P0 pulse.

"Waveform P5" is up from the back edge of P4 pulses to the back edge of P5 pulse.

"Waveform P9" is up from the back edge of P8 pulse to the back edge of P9 pulse.

"Waveform $9^1$" is up from the back edge of P0 pulse to the back edge of P9 pulse.

"Waveform *d*P9" is up from the back edge of P9 pulse to the front edge of P0 pulse.

The calculating machine has a digit keyboard 5 having 10 normally open digit key switches (not shown) representing the digit 0–9 respectively, which switches are closed when the corresponding keys (not shown) are depressed. The normally open contact of the digit key switches (not shown) representing the digits 0–9 respectively are connected to the pulses P9 to P0 respectively and the connections to the movable contact of the digit key switches are connected to a gate circuit 7 which has an output to a highway HW2. When a digit key (not shown) is depressed to close the corresponding digit key switch, a train of pulses of number equal to the digit corresponding to the digit key depressed, is repetitively transmitted along the highway HW2 until the depressed digit key is released.

The calculating machine also has a function keyboard 8 which has function key switches (not shown) marked with the following symbols "+," "–," "×," "," "decimal point," "constant," and "enter." The function key switches (not shown) marked "+," "–," "×," and "," which control the arithmetical functions of addition, subtraction, multiplication and division respectively, are similar to the digit key switches and are connected in a similar way to a gate circuit 9.

The output from the gate circuit 9 is connected to a highway HW3. When a function key is closed by depression of the function key, a corresponding function signal is transmitted along the highway HW3. The four function signals transmitted along highway HW3 are:

on depression of the "+," up at the back edge of P7, down at the back edge of P0;

on depression of the "–" key, up at the back edge of P7, down at the back edge of P0;

on depression of the "×" key, up at the back edge of P3, down at the back edge of P0;

on depression of the "" key, up at the back edge of P5, down at the back edge of P0.

The entry key transmits a "CE" signal along the line CE, when the entry key is depressed. The decimal point key transmits a "DP" signal along the line DP, when the decimal point key is depressed; and the constant transmits a constant signal $\pi$ along the line $\pi$ when the constant key is depressed.

A function counter circuit 10 which is a decade counter internally interconnected to have eight count stages, has seven of the outputs labeled in order of ascending count state the function positions F0, F1, F2, F3, F4, F5, F6, F7 respectively. The eighth count output, which is labeled the function position *d*F0, comes up at the back edge of the function position F0 and goes down approximately 0.5 msec. later. The input of the function counter circuit 10 is connected by a highway HW4 to a set of gates 11. The function counter outputs or function positions are connected to, and control the operation of, logic gates as hereinafter described. The function counter circuit 10 waits at F0 and when a function key is operated, the function counter circuit is driven by the pulses transmitted along highway HW4 to the corresponding function position which activates those logic gates which are used to perform the corresponding function. When the function is completed a stop gate (not shown) drives the output of the function counter circuit 10 back to F0.

The function controlled by the function positions are:

| | | | |
|---|---|---|---|
| F0 | display or wait | F4 | subtract |
| F1 | clear | F5 | divide |
| F2 | index | F6 | round off |
| F3 | add | F7 | multiply |

A timer circuit 12, which is a seven-position Johnson ring circuit is internally interconnected to have 13 count stages which are labeled in order of ascending count states TO, TD, T1, T2, T3, T4, T5, T6, T7, T8, T9, T10, and T11. The timer circuit 12 is driven continuously by P9 pulses from the input decade 2 so that the count state outputs are sequentially and continuously generated and each count state output lasts from the back of the P9 pulse to the back edge of the next P9 pulse.

A visual display 14 includes 10 number tube circuits each having a number tube 16 and 10 decimal point neon bulbs 17. The anodes of the number tubes 16 are connected in sequence to a positive potential under the control of the outputs T10 to T1 respectively of the timer circuit 12. The highest significant digit in a displayed number is positioned in the left-hand number tube, which is controlled by the output T10, by means of circuits hereinafter described.

One connection to each of the neon bulbs 17 is connected together and these are connected to the output T0 of the timer circuit 12. The cathodes of the 10 number tubes 16 which form the same digit shape such as 1, 2, 3 etc. are connected together. The other connection of the neon bulb 17 at the left-hand side of FIG. 1 is connected to the bunched cathode connections showing the digit zero; the other connection of the next neon bulb being connected to the bunched cathode connections showing the digit one; and so on until the other connection of the 10th neon bulb 17 at the right-hand side is connected to the bunched cathode connections showing the digit nine.

Figure 5:
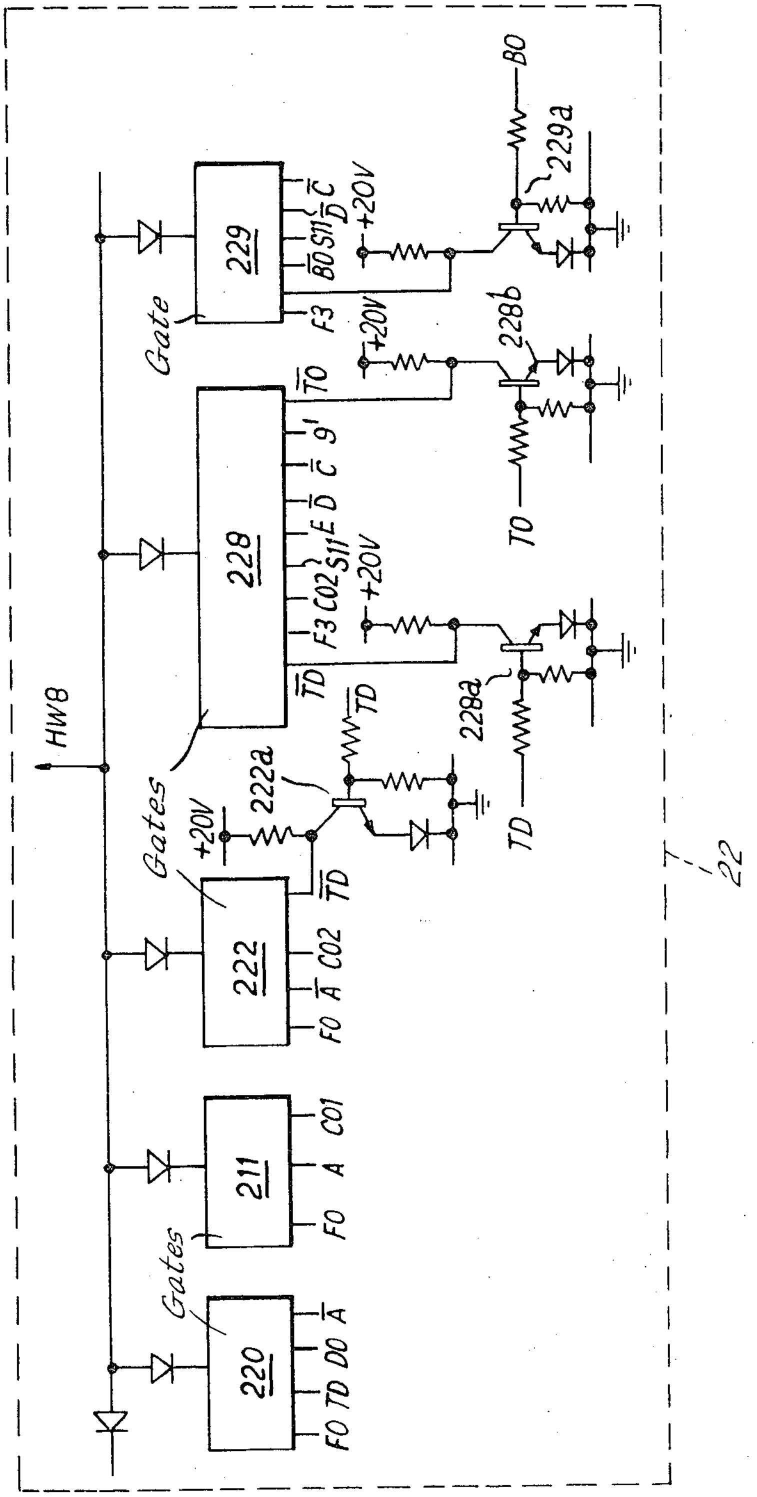
FIG. 5 shows part of the set of gates 22 shown in FIG. 1 in greater detail.

The 10 bunched cathode connections are connected respectively to the outputs of a row of bistables which form a staticizer 18. The inputs of the staticizer 18 are connected to the outputs of a storage means in the form of a buffer decade counter 20 which is internally interconnected so as to convert a train of pulses into the binary-coded decimal equivalent which appears on the outputs of the decade counter. The input of the buffer 20 is connected by a highway HW8 to the output of a third set of gates 22, part of which is shown in FIG. 5. The contents of the buffer 20 are cleared from the buffer 20 into the staticizer 18 at the front edge of each P0 pulse and the staticizer 18 is cleared, i.e., the digit zero line is energized, at the back edge of each P9 pulse. The buffer 20 has an output B0 which is energized i.e., goes to a positive potential, when the buffer 20 stays in the staticizer 18 for nearly the duration of an output from the timer circuit 12. The buffer output B0 is connected to the invertor circuits 229*a* (FIG. 5), 513*a* (FIG. 6) and 369*a* (FIG. 7) so that an inverted buffer output $\overline{B0}$ is produced.

The number tube 16 connected to the output T2 of the timer circuit 12 displays the units digit, the number tube 16 connected to the output T3 displays the 10's digit and so on. The position of the decimal point is given by a train of pulses loaded into the buffer 20 when the output TD of the timer circuit 12 is energized and is entered into the staticizer 18 and is displayed by the neon bulb 17 at the position corresponding to the number of pulses in the train, when the next output T1 of the timer circuit is energized. Similarly if for example the digit four is to be displayed at the 10's position, a train of four pulses is entered into the buffer 20 when the output T2 of the timer circuit is energized and the binary-coded-decimal equivalent of the digit four appears on the output of the buffer 20. The binary-coded-decimal output is transferred from the buffer 20 to the staticizer 18 at the pulse P0 and the digit four is displayed on that number tube 16 which is switched on when the output T3 of the timer circuit 12 is energized. The digit four is cleared from the staticizer 18 when the pulse P9 occurs at the end of the time in which the output T3 is energized. The frequency at which the outputs from the timer circuit 12 are energized are such that the digits appearing on the number tubes 16 and the decimal point appearing on a neon bulb 17 appear to be stationary because of the persistance effect of ocular vision.

A second or input register 24 has four shift registers 25*a*, 25*b* 25*c* and 25*d* each having 12 digit stages. The input and output of the four shift registers 25*a*, 25*b* 25*c* and 25*d* are each connected in a loop with a shift register buffer 26 in the form of four bistable circuits which are internally interconnected to form a decade counter and which act as the 13th digit stage. The shift pulse input to four shift registers 25*a*, 25*b*, 25*c* and 25*d* and the shift register buffer 26 are connected by a highway HW15 to a set of gates 34 part of which is hereinafter described (FIG. 3) The set of gates 34 provide shift pulses *d*P9 to the four shift registers 25*a*, 25*b* 25*c* and 25*d* and to the shift register buffer 26 so that the binary-coded-decimal digits in the four shift registers circulate through the shift register buffer 26 and back to the input of the shift registers respectively.

A carry pulse output of a bistable circuit of the shift register buffer 26 which output is energized when the digit in the shift register buffer 26 goes from the count of nine to the count of zero, is connected to the input of a carry store 28. The carry store 28 comprises a first bistable circuit 30 having the outputs C01 and $\overline{C01}$ and a second bistable circuit 32 having the output CP01. The "set" connections from the first bistable circuit 3030 and the second bistable circuit 32 respectively are connected to the carry pulse output of the shift register buffer 26. The first bistable circuit 30 is reset by a pulse P0 so that the output $\overline{C01}$ is energized i.e., is at a positive potential. A carry pulse from the shift register buffer 26 causes the output C01 to be energized. The second bistable circuit 32 is reset by a pulse P5, so that the output CP01 is not energized until a carry pulse is received from the shift buffer 26. A fifth set of gates 36, partly hereinafter described (FIG. 7), are connected by a highway HW5 to the input of the shift register buffer 26.

Figure 2:
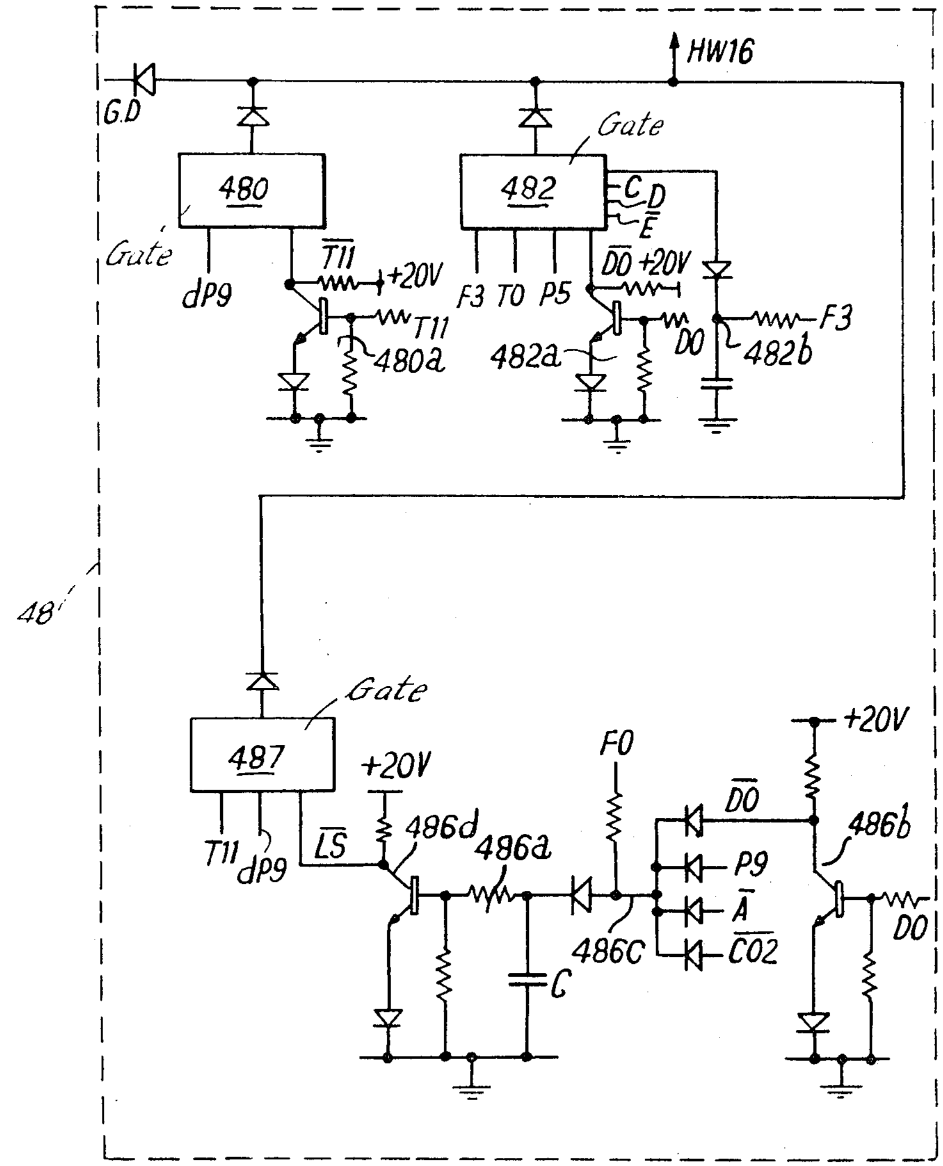
FIG. 2 shows part of the set of gates 48 shown in FIG. 1 in greater detail.
Figure 6:
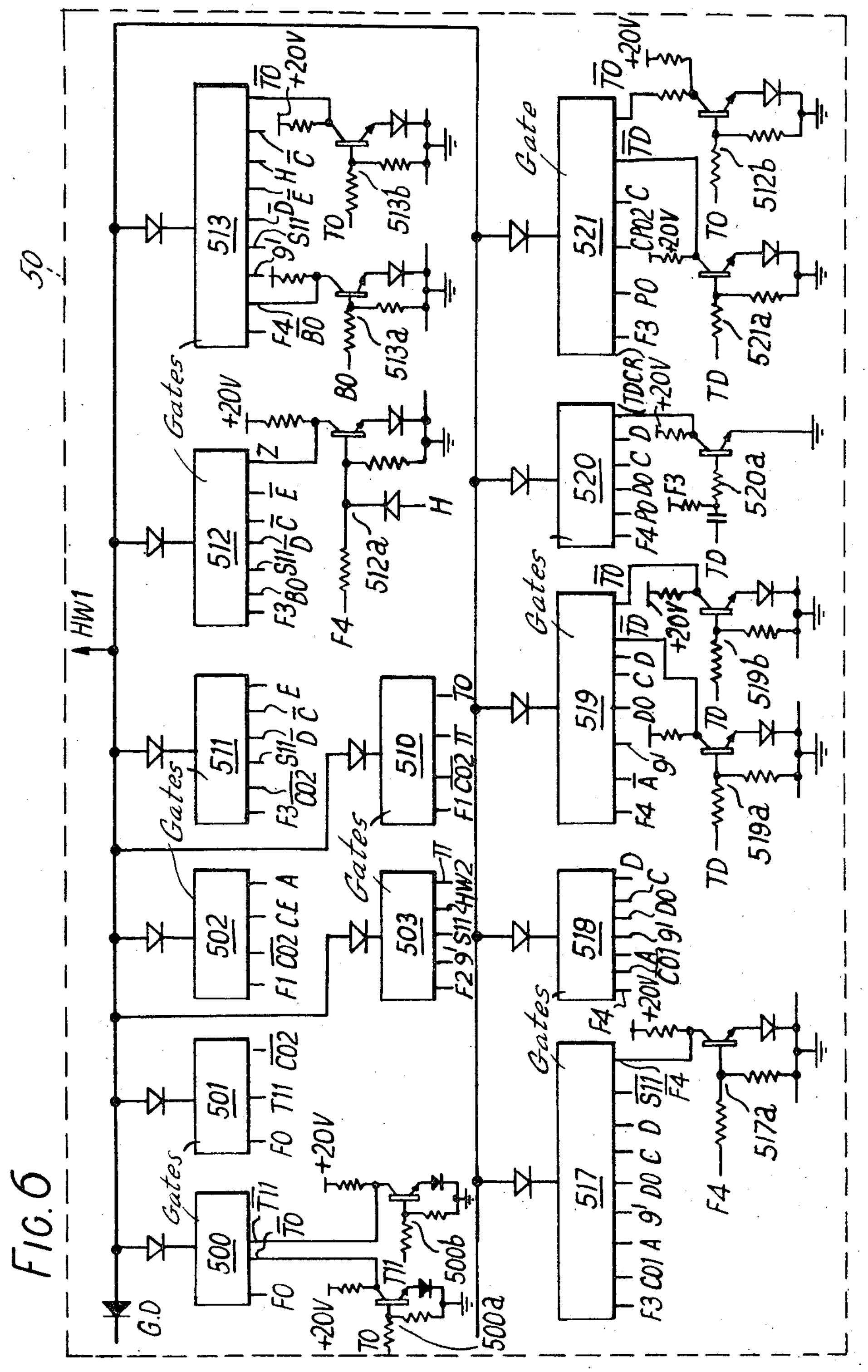
FIG. 6 shows part of the set of gates 50 shown in FIG. 1 in greater detail.

A first or accumulator register 38 has four 12-stage shift registers 39*a*, 39*b*, 39*c*, and 39*d* a shift register buffer 40 and a carry store 42 as previously described for input register 24. The shift pulse inputs of the four shift register 39*a*, 39*b*, 39*c* and 39*d* and the shift register buffer 40 are connected by a highway HW16 to a set of gates 48 partly hereinafter described (FIG. 2). The carry pulse output of the shift register buffer 40 is connected to the set input of the carry store 42 which comprises a first bistable circuit 44 having the outputs C02 and $\overline{C02}$ and a second bistable circuit 46 having an output CP02. The first circuit 44 is reset by a pulse P0 so that the output C02 is energized and the second bistable circuit is reset by a pulse P5 so that the output CP02 is not energized. The shift register buffer 40 is connected by a highway HW1 to a fourth set of gates 50, partly hereinafter described (FIG. 6).

Thus in the input register 24 and the accumulator register 38 the shift registers and the shift register buffers form 12-stage loops around which pulse patterns circulate in synchronism with the energized outputs of the timer circuit 12. If the input register 24 or accumulator register 38 receives 13 shift pulses, the digit in the units or T1 digit stage of the input register 24 or accumulator register 38 is in the shift register buffer 26 or 40 respectively when the output T1 of the timer circuit 12 is energized. Similarly the 10's or T2 digit stage of the input register 24 or a accumulator register 38 is in the shift register buffer 26 or 40 respectively when the output of the timer circuit T2 is energized, and so on.

If one shift pulse to a register is suppressed, so that the register only receives 12 shift pulses, the number in the register is moved one place to the left with respect to the outputs of the timer circuit 12.

If an extra shift pulse is gated into a register with the pulse P5, the number in the register is moved one place to the right with respect to the outputs of the timer circuit 12.

Figure 11:
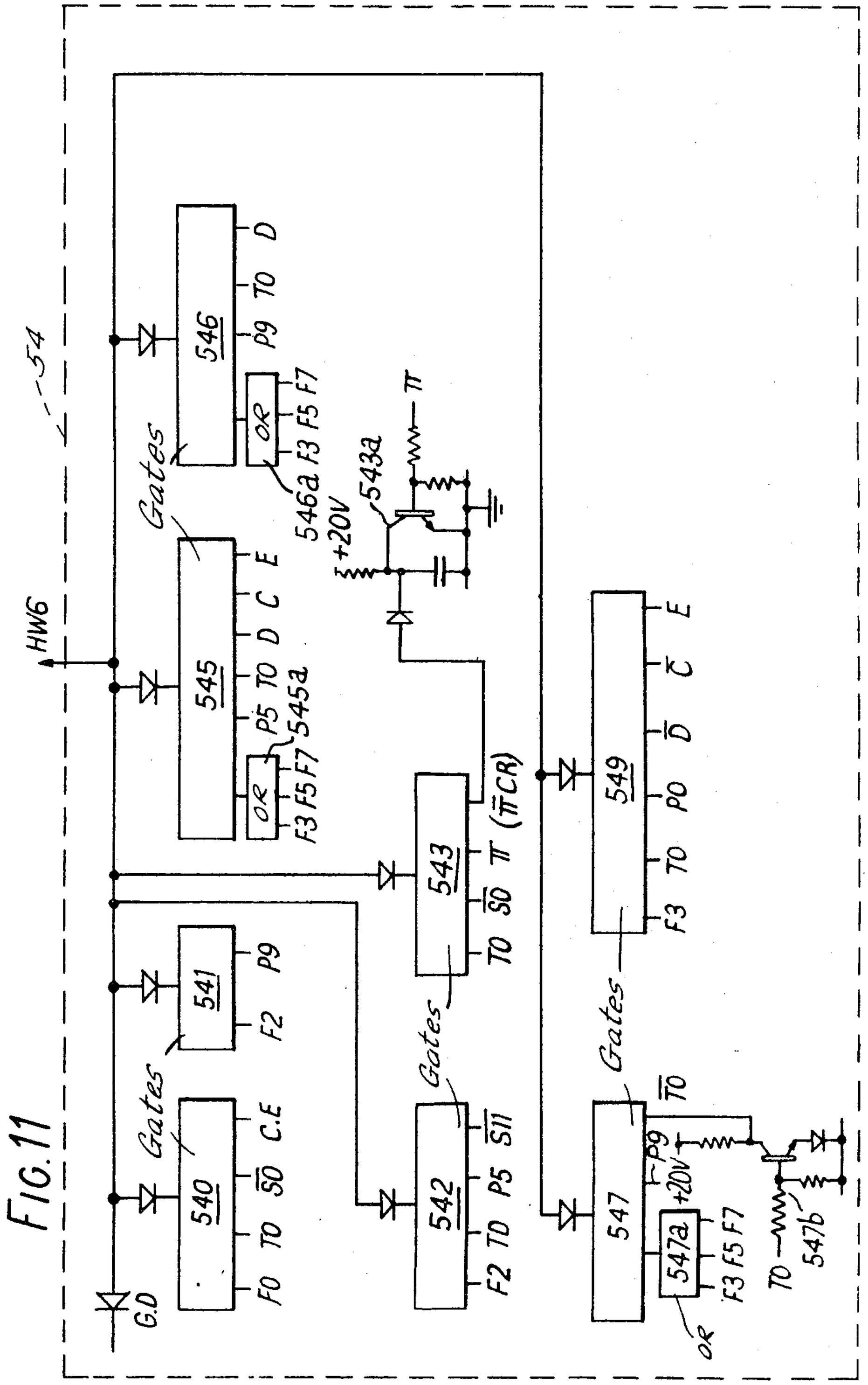
FIG. 11 shows part of the set of gates 55 shown in FIG. 1 in greater detail.

A slip counter 52, which is a four-bistable ripple-through counter internally interconnected to have 13 count states which are labeled in ascending order of count state S0 SD S1...S11, has outputs connected to the S0 and S11 count states. The outputs to the count states S0 and S11 are connected to invertor circuits (not shown) to give the outputs $\overline{S0}$ and $\overline{S11}$ respectively and S0. The outputs S11 $\overline{S11}$ and S0 are used to control logic circuit gates. The input of the slip counter 52 is connected by a highway HW6 to a set second set of gates 54. The slip counter 52 is driven by P9 pulses to maintain its energized count states in correspondence with the energized count state outputs of the timer circuit 12. Shift pulses are suppressed or extra ones gated in through the set of gates 54 partly shown hereinafter (FIG. 11). The main purpose of the slip counter 52 is to keep a record of the amount of slip with respect to the timer circuit 12 which occurs when a number is shifted in the input register 24 or the accumulator register 38.

Figure 4:
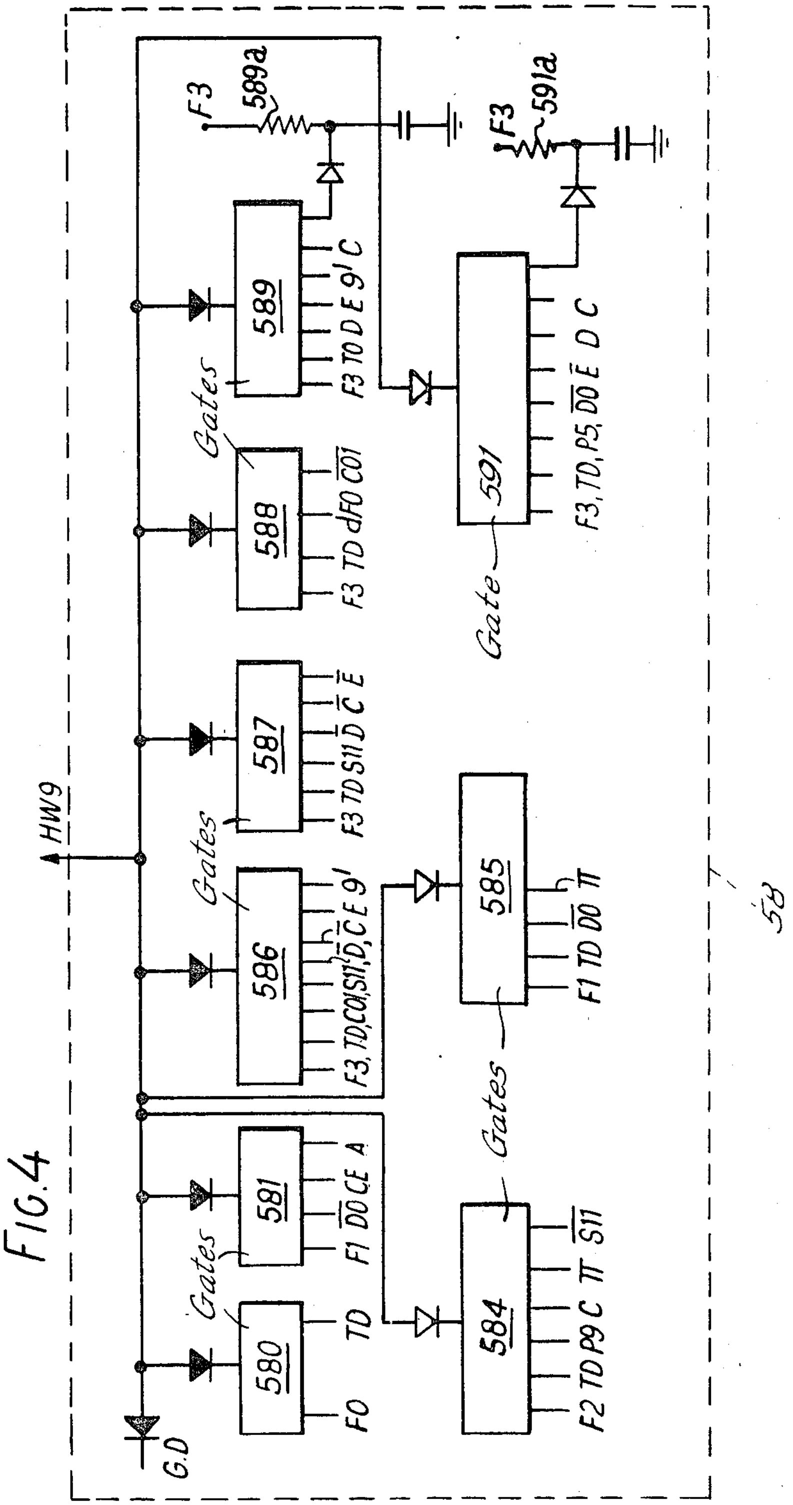
FIG. 4 shows part of the set of gates 58 shown in FIG. 1 in greater detail.

A decimal counter 56, which is a four-bistable ripple-through counter internally interconnected so as to have 10 count states, has its output connected to the set input of an output bistable circuit 60. The input of the decimal counter 56 is connected by a highway HW9 to a set of gates 58, partly hereinafter described (FIG. 4). The output bistable circuit 60 has the outputs D0 and $\overline{D0}$. The output bistable circuit 60 is arranged so that the output D0 is energized when the count in the decade counter 56 goes to or passes through the zero count state; the output bistable circuit 60 is arranged so that the output $\overline{D0}$ is energized by the next P0 pulse.

The decimal counter 56 holds the count corresponding to the position of the decimal point digit of a number stored in the accumulator register 38. This decimal point digit is held separately from the other digits in the accumulator register 38 because the accumulator register is used for calculation of products and quotients and the whole accumulator register 38 is required for holding partial products or partial remainders during the calculation. The decimal point digit is also held separately because the answer in the accumulator register 38 may need to be repositioned so as to display the most significant digit of the answer in the left-hand number tube 16 of the visual display 14, and this is more easily done if the decimal point digit is held separately.

Figure 8:
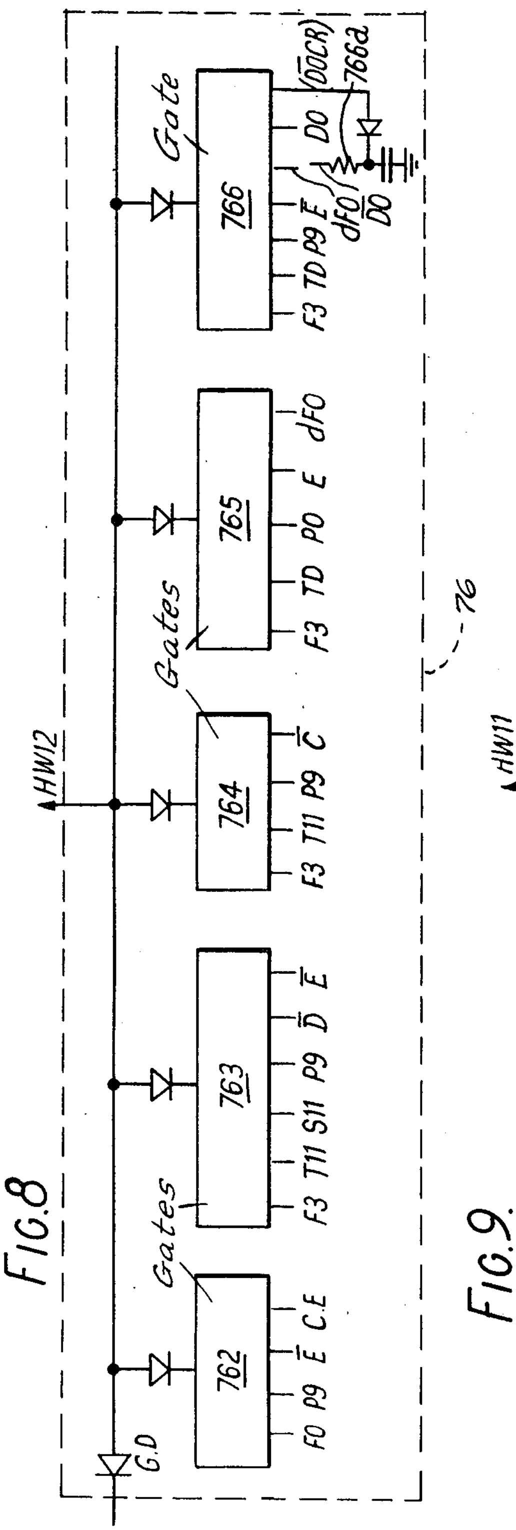
FIG. 8 shows part of the set of gates 76 shown in FIG. 1 in greater detail.
Figure 9:
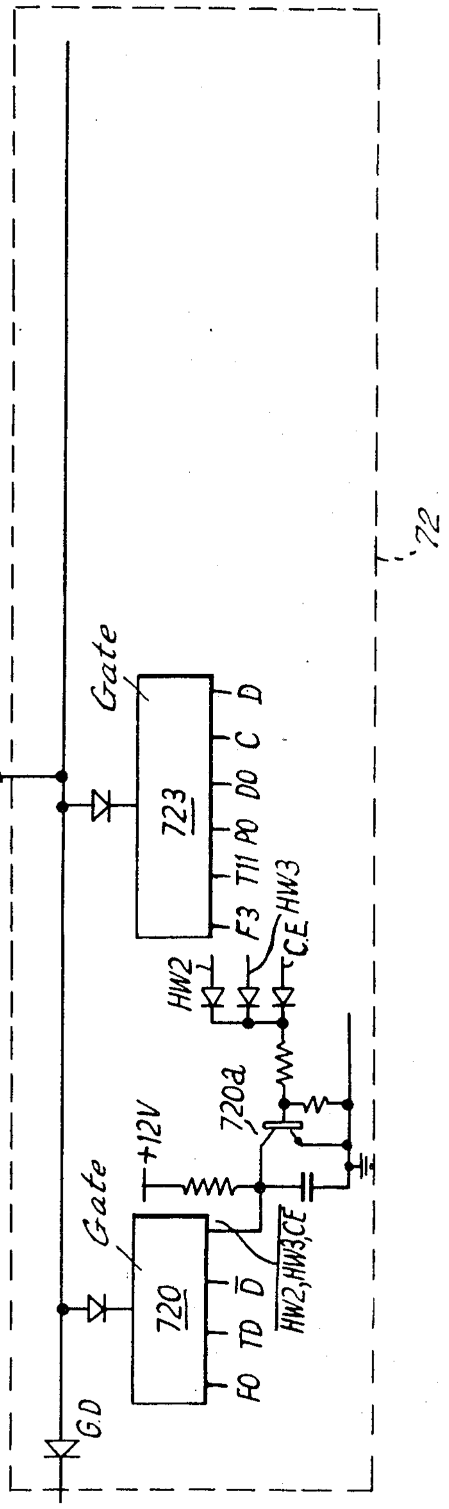
FIG. 9 shows part of the set of gates 72 shown in FIG. 1 in greater detail.

A bistable circuit 62 having the outputs A and $\overline{A}$ has the input connected by a highway HW13 to a set of gates 64. A bistable circuit 66 having the outputs C and $\overline{C}$ has the input connected by a highway HW7 to a set of gates 68. A bistable circuit 70 having the outputs D and $\overline{D}$ has the input connected by a highway HW11 to a set of gates 72, partly hereinafter described (FIG. 9). A first bistable circuit 74 having the one and the other outputs E and $\overline{E}$ respectively has the input connected by a highway HW12 to first a set of gates 76, partly hereinafter described (FIG. 8). A bistable circuit 78 having the outputs H and $\overline{H}$ has the input connected by a highway HW14 to a set of gates 80 partly hereinafter described (FIG. 13).

The bistable circuit 62 controls which register has its number displayed by the visual display 14; if the bistable circuit 62 is set so that the output A is energized the number stored in the input register 24 is displayed; if the bistable circuit 62 is set so that the output $\overline{A}$ is energized, the number stored in the accumulator register 38 is displayed.

The second bistable circuit 66 having the outputs C and $\overline{C}$ controls the time at which the input register 24 can shift with respect to the accumulator register 38 so that the four arithmetic functions can be performed by the calculating machine. If the bistable circuit 66 is set so that the output C is energized, shift can take place; if the bistable circuit 66 is reset so that the output $\overline{C}$ is energized the registers are held so that shift cannot take place.

The bistable circuit 70 together with the bistable circuit 66 controls the number of shift pulses sent through the set of gates 34 and 48 to the input register 24 and the accumulator register 38 respectively. The control operation is more fully described hereinafter.

The bistable circuit 74 has a control function as hereinafter described.

The FIGS. 2 to 13 show in greater detail, part of some of the set of gates shown in FIG. 1. Unless otherwise indicated in the description the circuits shown are AND logic circuit gates.

The FIG. 2 shows in detail part of the set of gates 48 shown in FIG. 1. The set of gates 48 includes the AND-gates 480 and 487, a transistor invertor circuit 489*a*, a time delay circuit 482*b*, an a circuit 486*a*. The circuit 486*a* comprises a transistor invertor circuit 486*b* whose input is connected to the output D0 of the output bistable 60 and whose output is connected to an AND-logic gate 486*c*. The output of the AND-gate 486*c* is connected to a capacitor C and to a transistor invertor circuit 486*d*.

Figure 3:
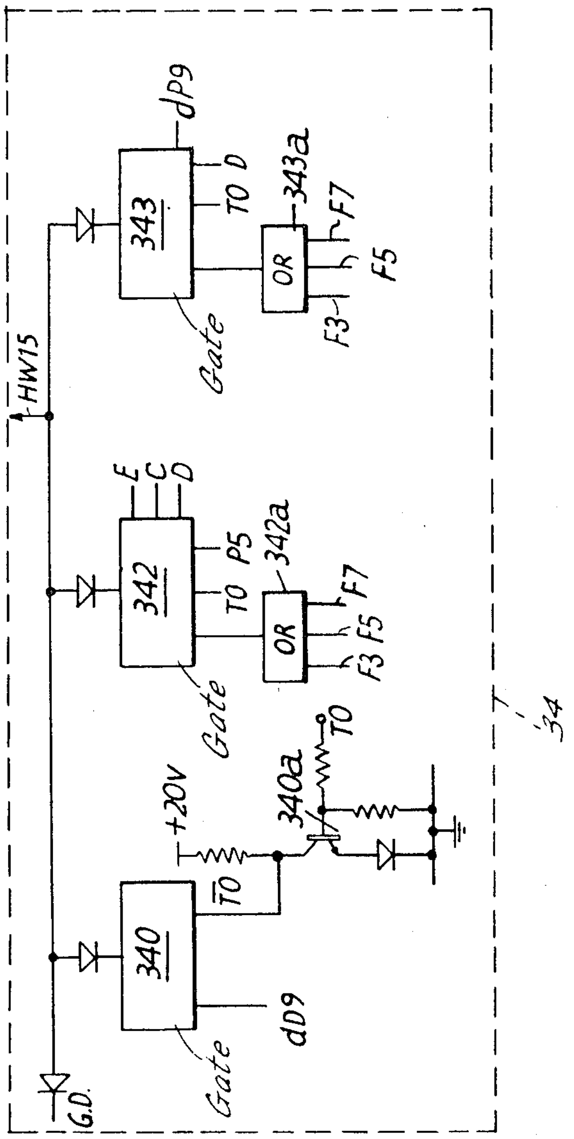
FIG. 3 shows part of the set of gates 34 shown in FIG. 1 in greater detail.

The FIG. 3 shows in detail part of the set of gates 34 shown in FIG. 1. The circuit in the figure comprise the AND-gates 340, 352 and 353, the OR-gates 342*a* and 343*a* and a transistor invertor circuit 340*a* for the output TO of the timer circuit 12.

The FIG. 4 shows in detail part of the set of gates 58 shown in FIG. 1. The circuits in the FIG. comprise the AND-gates 580, 581, 584, 585 586 to 589 and 591, and the timer-delay circuits 589*a* and 591*a*.

The FIG. 5 shows in detail part of the third set of gates 22 shown in FIG. 1. The circuits in the figure comprise the AND-gates 220, 211, 222, 228 and 229 and the invertor circuits 222*a* , 228*a* , to 228*b* and 229*a*, for the outputs TD of the timer circuit 12, TO and B0.

The FIG. 6 shows in detail part of the set of gates 50 shown in FIG. 1. The circuits in the figure comprise the AND-gates 500 to 503, 510 to 513, and 517 to 521, transistor invertor circuits 500*a* 500*b*, 513*a* 513*b*, 517*a*, 519*a*, 519*b*, 521*a* and 512*b*, a transistor invertor AND-gate 512*a* and the transistor invertor time delay circuit 520*a*.

Figure 7:
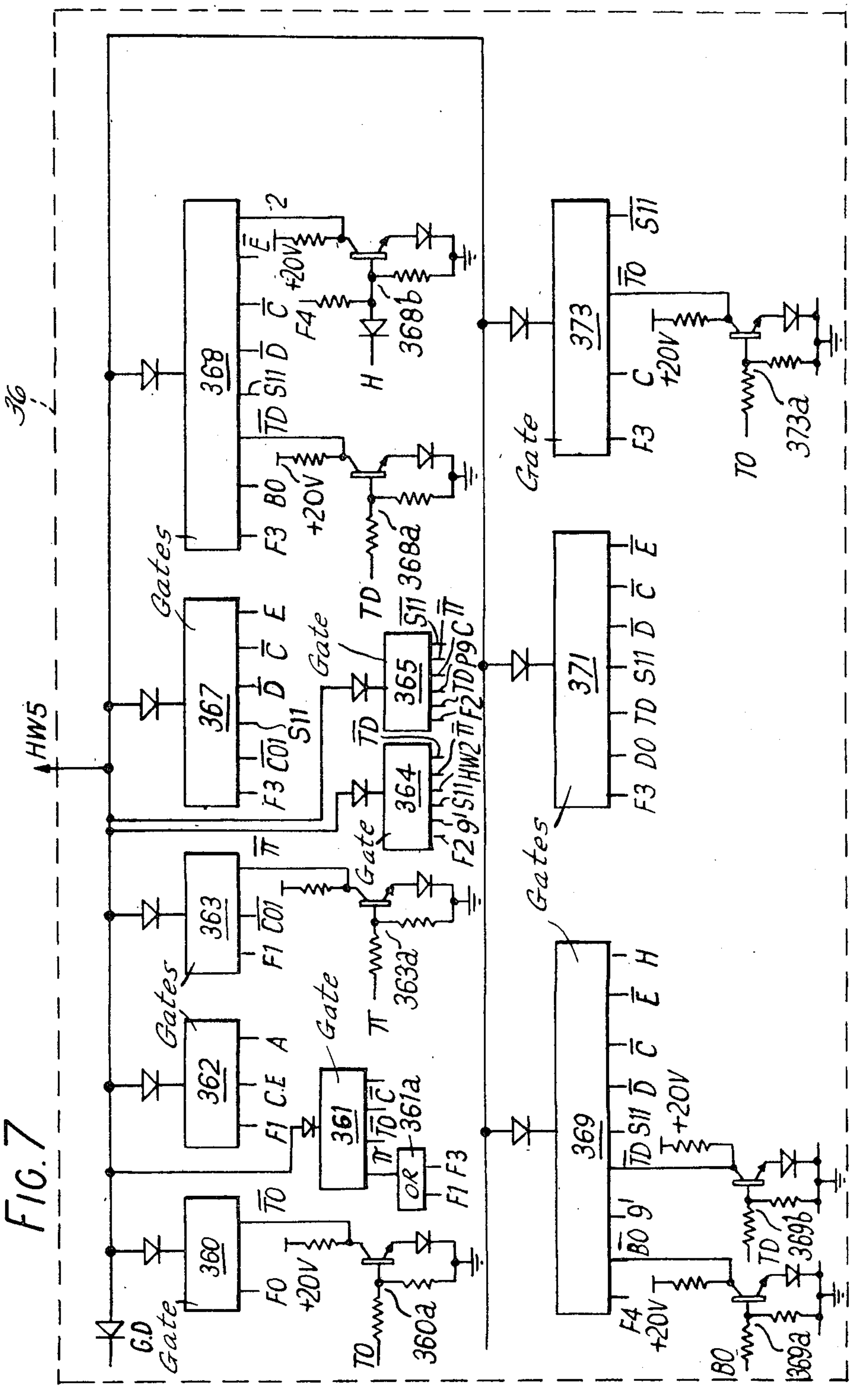
FIG. 7 shows part of the set of gates 36 shown in FIG. 1 in greater detail.

The FIG. 7 shows in detail part of the set of gates 36 shown in FIG. 1. The circuits in the figure comprise the AND-gates, 360, 361, 362, 363, 364, 365, 367 to 369, and 371 to 373, the transistor-invertor circuits 360*a*, 363*a* 368*a*, 369*a*, 369*b* and 373*a*, OR-gate 361*a* and a transistor invertor AND-gate 368*b*.

The FIG. 8 shows in detail part of the set of gates 76 shown in FIG. 1. The circuit shown in the figure comprises the AND-gates 762 to 766 and a time delay circuit 766*a* .

The FIG. 9 shows in detail part of the set of gates 72 shown in FIG. 1. The circuits shown in the figure comprise the AND-gates 720 and 723 and a transistor invertor OR-gate circuit 720*a*.

Figure 10:
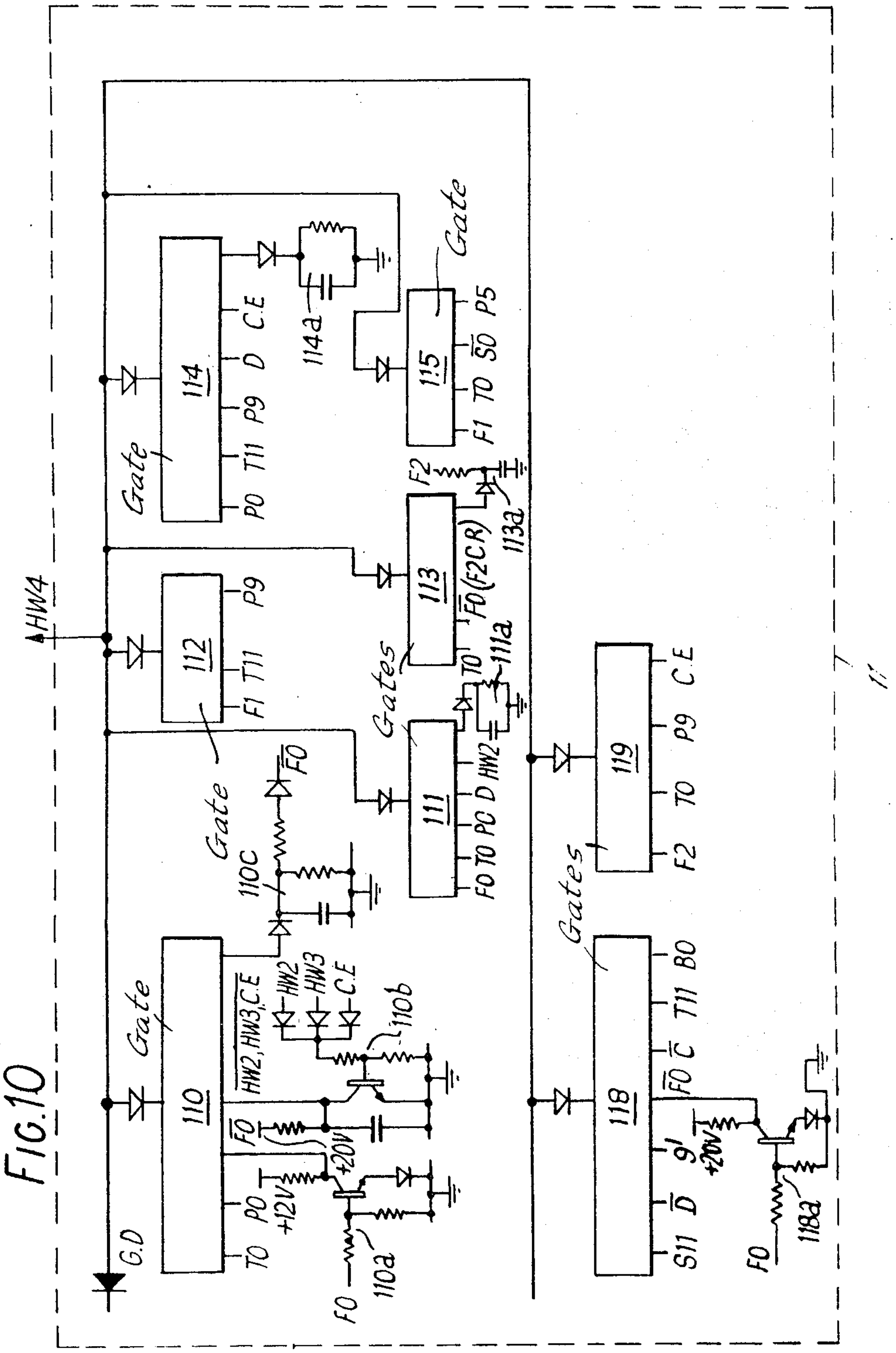
FIG. 10 shows part of the set of gates 11 shown in FIG. 1 in greater detail.

The FIG. 10 shows in detail part of the set of gates 11 shown in FIG. 1. The circuit shown in the figure comprises the AND-gates 110, 111, 112, 113, 114, 115, 118 and 119, the transistor invertor circuits 110*a* and 118*a* the transistor invertor and OR-gate 110*b*, ¼-second time delay circuits 110*c*, 111*a* and 113*a* and a 10-millisecond time delay circuit 114*a*.

The FIG. 11 shows in detail part of the set of gates 54 shown in FIG. 1. The circuit shown in the figure comprises the AND-gates 540, 541, 542, 543, 545 to 447 and 549, the OR-gates 545*a*, 546*a* and 547*a*, a transistor invertor circuit 547*b* and a transistor invertor and time delay circuit 543*a*.

The FIG. 12 shows in detail part of the set of gates 68 shown in FIG. 1. The circuit shown in the figure comprises the AND-gates 680, 682, 684 and 689 and the transistor invertor and time delay circuit 684*a*.

The FIG. 13 shows in detail part of the set of gates 80 shown in FIG. 1. The circuit shown in the figure comprises the AND-gates 801 and 802.

The FIG. 14 shows in detail part of the set of gates 64 shown in FIG. 1. The circuit shown in the figure comprises the AND-gates 640 and 641.

The gate 480 (FIG. 2) supplies 12 shift pulses *dp*9 and the gate 486 supplies the 13th shift pulses if the input $\overline{LS}$ is energized, so that the shift pulses to the accumulator register 38 and the outputs of the timer circuit 12 occur in synchronism.

The calculating machine has other circuitry (not shown) which is interconnected with the parts of the calculating machine shown in the figures so that numbers can be entered into the input register 24 and accumulator register 38 through the digit keyboard 5, which numbers are used to perform arithmetic calculations selected from those on the function keyboard 8.

The answer to a calculation is stored in and circulates around the accumulator register 38 and is displayed when the inputs marked F0 on the various gates are energized. A digit is shifted into the shift register buffer 40 of the accumulator register 38 by a *dp*9 pulse which occurs at the same time as the next output of the timer circuit 12 is energized. The gate 500 (FIG. 6) is energized for the outputs T1, TD and T2 to T10 of the timer circuit 12 and allows ten oscillator GD pulses (corresponding to the pulses P0 to P9) to circulate the digit in the shift register buffer 40. At the same time the gate 222 (FIG. 5) is shut (since the first bistable circuit 44 was reset by the first pulse P0) and does not allow oscillator GD pulses to pass into the buffer 20. When the digit in the shift register buffer 40 goes through zero, a pulse is passed to the first bistable circuit 44 and the second bistable 46 so that the outputs C02 and CP02 are energized. When the input C02 is energized the gate 222 allows a number of oscillator pulses GD, which are equal to the digit in the shift register buffer 40, to enter the buffer 20. As previously described, the digit in the buffer 20 is cleared into the staticizer 18 at the next P0 pulse (which also resets the first bistable circuit 44) and the digit is displayed on the visual display 14.

An outline of the various sequences of internal operations initiated when the 'enter' key is depressed at various stages during the operation of the calculating machine will now be given. A detailed description of these various sequences of internal operation will be given later.

The 'clear' can be depressed at three places during the operation of the calculating machine. These places are (a) immediately after switch-on of the calculating machine, (b) after entry of a number into the calculating machine and (c) after the operation of a function key.

The effect of depressing the 'clear' key immediately after switch-on is to initiate a program which sets certain counter circuits and bistable circuits to initial conditions and also initiates a program in which the number in the accumulator register 38 is cleared while the number in the input register 24 is not cleared but is circulated. The number in the input register 24 is then added to the cleared accumulator register 38 by an addition routine. The number the accumulator resister 38 is then copied back into the input register 24 by a copy routine so that the number originally in the input register 24 ends up in the input register 24 and the accumulator register 38.

The addition routine begins with a subroutine which comprises the subtraction of the decimal point count of the input register 24 from the decimal point count of the accumulator register 38 and then a relative shift between the input register and the accumulator register by a number of stage positions equal to the difference between the decimal point counts. The addition subroutine then follows with the answer stored in the accumulator register. The answer in the accumulator register 38 may be shifted within this register by circuits not described so that the highest significant digit is displayed in the number tube 16 of the visual display 14 which is energized by the "output" T10 of the timer circuit 12.

The copy routine, which follows the addition routine, comprises a two-stage routine which is continuously repeated. When the copy routine is initiated, the first stage begins with the most significant digit of the number in the accumulator register 38 being transferred to the buffer 20. During the first stage the highest significant digit stages of the input register 24 and the accumulator register 38 are cleared. During the second stage the highest significant digit stored in the buffer 20 is transferred into the cleared highest significant digit stages of the input register 24 and the accumulator register 38. This two-stage sequence is repeated digit-by-digit until the number remaining in the accumulator register 38 after the addition routine has been copied into both the input register 24 and the accumulator register 38.

The effect of depressing the 'clear' key after the entry of a number into the calculating machine is to cause the number which is entered in the input register 24 to be added into the cleared accumulator register 38 and then copied into the input register 24 and the accumulator register 38. The addition and copy routines are identical to those previously described.

The effect of depressing the 'clear' key after the depression of the function key is to cause the zeros of the cleared input register 24 to be added to the number in the accumulator register 38. The unchanged number in the accumulator register 38 is then copied into the input register 24 and accumulator register 38. The addition and copy routines are identical to those previously described.

A detailed description of the operations previously outlined will now be give.

In the description, the stage of the input register 24 or the accumulator register 38 from which a digit is taken and loaded into the buffer 20 when an output of the timer circuit energized is for convenience labeled with that timer circuit output. For example, the digit which is loaded into the buffer 20 when the timer circuit output TD is energized is called the TD stage of the input register 24. Also, in the description, a timing period means the time taken for the outputs T0 TD to T11 inclusive of the timer circuit 12 to be energized in sequence.

The calculating machine operates as follows:

When the calculating machine is switched on the gate 110 clears the function counter circuit 10 to the output F0 after a delay of ¼ second. At the end of this delay, other gates having the function counter output F0 as an input are in the 'enabled' state. The gate 720 resets the bistable circuit 70 to energize the output D. The gate 500 circulates the number in the accumulator register 38 and the gate 501, clears the T11 stage of the accumulator register 38. The gate 580 circulates the decimal count stored in the decimal counter 56, when the output TD of the timer circuit 12 is energized. The gate 360 circulates the number in the input register 24. The gate 221 loads the buffer circuit 20 to display the number stored in the input register 24 or the gates 220 and load the buffer circuit 20 to display the number stored in the accumulator register 38. The gate 501 clears the digit stage of the accumulator register 38 which is enabled by the energized T11 output of the timer circuit 12.

If the enter key on the function keyboard 8 is depressed immediately after switch-on the depression of the 'enter' key causes the 'clear and enter' signal CE to be energized, i.e. to go from 0 volts to +12 volts. The gate 540 clears the slip counter 52 so that the count state F0 is energized. The gate 680 sets the bistable circuit 66 to energize the output C.

The gate 762 energizes the output E of the bistable circuit 74 if the output $\overline{E}$ was previously energized. The gate 114 pulses the function counter 10 so that the output F1 is energized. The gate 362 circulates the number stored in the input register 24 if the output A of the bistable circuit 62 is energized, and overrides the gate 363 which would otherwise clear the input register 24. The gate 502 clears the number in the accumulator register 38 and the gate 581 clears the accumulator decimal point count from the decimal counter 56. The gate 112 pulses the function counter 10 so that the output F2 is energized. The gate 541 causes the output of the slip counter 52 to move directly form S0 to S11. The gate 119 pulses the function counter 10 so that the output F3 is energized and the addition routine is initiated. The gate 801 ensures that the output $\overline{H}$ of the bistable circuit 78 is energized.

The addition routine begins with the following outputs energized: bistable circuits outputs A or $\overline{A}$, C, D, E and $\overline{H}$; slip counter output S11; function counter output F3; timer circuit output T0 and input decade output P0.

The first subroutine of the addition subroutine is to align the numbers in input register 24 and the accumulator register 38 so that, in effect, the decimal point counts are the same. This alignment is done by subtracting the input register decimal point count from the accumulator register decimal point count stored in the decimal counter 56 by means of the gate 588. At the end of the subtraction subroutine, the output of the bistable circuit 60 is energized depends on which register originally had the greater decimal point count. If the decimal point count of the accumulator register is greater than the decimal point counter of the input register (Case 1) the energized output of the output bistable circuit 60 is changed from the output $\overline{D0}$ to the output D0 and a pulse count which is equal to the difference between the decimal points is stored in the decimal counter 56. If the decimal point count of the input register 24 is greater than the decimal point count of the accumulator register 38 (case 2), the energized output of the output bistable circuit 60 remains unchanged to $\overline{D0}$ and a count equal to the 10's complement of the difference between the decimal points is stored in the decimal counter 56.

When the accumulator register decimal point count is greater than the input register decimal point count (case 1), each time the output TD of the timer circuit 12 is energized the gate 765 sets the bistable circuit 74 so that the output $\overline{E}$ is energized and; because in this condition the output D0 is energized, the gate 766 resets the bistable circuit 74 so that the output E is energized. When the next timer output, the output T1 of the time circuit 12 is energized, the pulse P0 sets the output bistable circuit 60 so that the output $\overline{D0}$ is energized. During the next timing period of the timer circuit 12 during which the outputs T0 to T11 are sequentially energized, the gates 480 and 487 pass 13 shift pulses to the accumulator register 38 while the gates 340, 342 and 343 and the gates 545, 546 and 547 pass 14 shift pulses to the input register 24 and the slip counter 52 respectively so that the input register 24 moves one digit stage with respect to the accumulator register 38. During this timing period of the timer circuit 12 the gate 589 causes the nine pulses of the output 9: from the input decade 2 to circulate and reduce by one the count in the decimal counter 56. The timing periods of the timer circuit 12 and the operation of the gates previously described are repeated until the difference count in the decimal counter 56 is zero so that the output D0 of the output bistable circuit 60 remains energized after the application of the reset pulse P0 occuring when the timer output T1 is energized. The second subroutine of the addition routine, the addition of the number in the input register 24 to the number in the accumulator register 38, follows and is described later.

When the input register decimal point count is greater than the accumulator register decimal point count (case 2), each time the output TD of the timer circuit 12 is energized the gate 765 sets the bistable circuit 74 so that the output $\overline{E}$ is energized. During the next timing period of the timer circuit 12, during which the outputs T0 to T11 are sequentially energized, the gates 340 and 343 and the gates 546 and 547 pass 13 shift pulses to the input register 24 and the slip counter 52 respectively and the gates 480, 482 and 487 pass 14 shift pulses to accumulator register 38 which moves one digit stage with respect to the input register 24. During this timing period of the timer circuit 12 the gate 591 causes a pulse to increase by one the count in the decimal counter 56. The timing periods of the timer circuit 12 and the operation of the gates previously described are repeated until the count in the decimal counter 56 is zero so that the output D0 of the output bistable circuit 60 remains energized after the application of the reset pulse P0 occuring when the timer output T1 is energized. The second subroutine of the addition routine, the addition of the number in the input register 24 to the number in the accumulator register 38, follows and is described later.

The second subroutine of the addition routine, the addition operation, begins when the output D0 of the output bistable circuit 60 remains energized after the application of the reset pulse P0 occuring when the timer output T1 is energized. The gates 373, 517 and 521 control the addition of the number in the input register 24 to the number in the accumulator register 38. At the end of the addition routine the gate 723 pulses the bistable circuit 70 so that the output $\overline{D}$ is energized and the gate 689 pulses the bistable circuit 66 so that the output $\overline{C}$ is energized. The digit stage T11 of the accumulator register 38 is left in the cleared state at the end of the addition routine. If the accumulator T11 digit stage has a carry from the T10 digit stage, gate circuits (not shown) shift by one digit the number stored in the accumulator register so that the most significant digit of the number is shifted from the T11 digit stage to the T10 digit stage.

The subtraction routine is similar to the addition routine and uses the usual method of adding the nines complement of the number in the input register 24 plus one digit to the number in the accumulator register, using the gates 518, 519 and 520 (FIG. 6). As the addition and subtraction routines are so similar, when the other function counter output F4 is energized, the one output F3 is also energized and any addition gates not required for subtraction are closed by the $\overline{F4}$ signal from the output of the invertor circuit 517*a* (FIG. 6) whose input is connected to the F4 output.

At the end of the second subroutine of the addition routine and the beginning of the copy routine, the output T11 of the timer circuit 12 and the output S11 of the slip counter 52 are energized, together with the outputs $\overline{C}$ and $\overline{D}$ of the bistable circuits 66 and 70 respectively. The gate 763 ensures that output E of the bistable circuit 74 is energized at the beginning of the copy routine and during the first timing period of the timer circuit 12. During the first timing period the gate 549 controls the transmission of one pulse to the slip counter 52 so that the gates 228, 367 and 511 are energized when the timer circuit output T10 coincides with the slop circuit output S11. The gate 228 and the gate 511 clear the T10 stage of the accumulator register 38 into the buffer 20. The gate 367 clears the T10 stage of the input register 24. At the end of the first timing period the gate 764 pulses the bistable circuit 74 so the output E is energized. During the next timing period of the timer circuit 12 the gate 229 zeros the buffer while the gates 368 and 512 control the transmission of the contents of the buffer to the T10 stages of the input register 24 and the accumulator register 38 respectively. At the end of the second timing period the gate 764 pulses the bistable circuit 74 so that the output $\overline{E}$ is energized. At the beginning of the third timing period the gate 549 controls the transmission of one pulse to the slip counter 52 so that the gates 228, 367 and 511 are energized when the timer circuit output T9 coincides with the slip counter output S11. The copy routine continues until the timer circuit output TD coincides with the slip counter output S11 so that the gate 586 adds the input register decimal point while the output E of the bistable circuit 74 is energized. The gates 587 and 371 cause the accumulator decimal point to be circulated and copied into the TD stage of the input register respectively, when the output $\overline{E}$ of the bistable circuit 74 is energized. When all of the numbers have been copied, the output B0 of the buffer 20 is energized at the same time as the timer circuit output T11 and the slip counter output S11, so that the gate 118 pulses the function counter 10 so that the output F0 is energized so that the copied number is displayed on the visual display 14.

If as a result of the subtraction operation performed immediately before the copy routine, the answer to subtraction operation is negative the subsequent copy routine is changed to complement copy routine. If at the end of the subtraction operation, the answer is negative, the gate 802 pulses the bistable circuit 78 so that the output H is energized. The output H causes the gates 368 and 512 to be closed and the gates 369 and 513 to be opened so that the complement of the digit in the buffer 20 is transferred or copied to the input register 24 and the accumulator register 38 respectively, when the output $\overline{E}$ of the bistable 74 is energized. Thus the complement copy routine only differs from the ordinary or noncomplement copy routine by the value of the digit transferred from the buffer 20 to the input register 24 and the accumulator register 38.

If the 'enter' key of the function keyboard 8 is depressed after a number has been entered, or indexed into the input register 24, an identical operation occurs to that previously described when the clear key is depressed after switch-on. Thus the number originally entered into in the input register 24 is copied into the input register 24 and the accumulator register 38.

If the 'enter' key on the function keyboard 8 is depressed after an arithmetical operation has been completed, the input register 24 is cleared and the accumulator register 38 is not cleared, since the answer to the arithmetic operation is stored in the accumulator register. At the end of the arithmetic routine the output $\bar{A}$ of the bistable circuit 62 is energized so that the answer stored in the accumulator register 38 is displayed by the visual display 14. The effect of depressing the 'clear' key causes the same sequential operation of the function counter outputs F0, F1, F2 and F3 as previously described. However, after the gate 114 pulses the function counter 10 so that output F1 is energized, the energized output $\bar{A}$ inhibits the gates 502 and 581 to prevent the accumulator register from being cleared. The energized output $\bar{A}$ also inhibits the gate 362, which prevents the input register 24 from being cleared, so that the gate 363 controls the clearing of the input register 24. The gate 112 pulses the function counter 10 so that the output F2 is energized and the subsequent operations are identical to those previously described.

The copy routine and the complement copy routine are not limited to use with the addition and subtraction routines respectively described above. The copy routines can be arranged to be directly or indirectly initiated by any of the outputs of the function counter 10.

The digits of a number are entered into the input register 24 of the accumulator register 38 by means of an entry routine hereinafter described which is initiated by the depression of one of the keys of the digit keyboard 5. The digits of the number are normally entered into the input register 24 by the entry routine. If it is required that the number in the input register 24 is to be retained and a further number is to be entered into the accumulator register 38, the function key switch 8*c* marked 'constant' on the function keyboard 8 is depressed and latched down before the number is entered so that the entry operation is modified as hereinafter described. When the 'constant' function key switch 8*c* is latched down, the number stored in the input register 24 is held until the 'constant' function key switch 8*c* is released. If a copy routine is performed while the 'constant' function key switch 8*c* is latched down, the number is not copied from the accumulator register 38 into the input register 24. The 'constant' function key switch 8*c* can also be used to correct an error occuring during the entry of a number into the input register 24 or the accumulator register 38. The incorrect number is removed from the register by momentarily moving the constant function key switch 8*c* from its original operating position to the opposite operating position and back again before entering the correct number into the register.

A detailed description of the operations previously described will now be given.

The initial or waiting conditions of the bistable circuits at the beginning of a digit entry routine are as follows: the bistable circuit 62 has either the output A or the output $\bar{A}$ energized; the bistable circuit 66 has the output C energized; the bistable circuit 70 has the output D energized and the bistable circuit 78 has the output H energized if the number to be entered is negative, or has the output $\bar{H}$ energized if the number to be entered is positive. The bistable circuit 74 is not operated during the digit-entry routine and either the output E or the output $\bar{E}$ is energized. The slip counter 52 is at the count state S0 and the function counter circuit 10 has the output F0 energized.

The entry of the digits of a number into the input register 24 is initiated by the depression of that key switch on the digit keyboard 5 which corresponds to the first digit of the number to be entered. The digit keyboards and the gate 7 continuously transmit along the highway HW2 a train of pulses of number equal to the first digit for as long as the corresponding digit key switch is depressed. The train of pulses along the highway HW2 pass through the gate 111 after a 10 millisecond time delay caused by the time delay 111*a* so as to pulse the function counter 10 from the output F0 to the output F1. The gate 363 clears the input register 24 during one timing period of the timer circuit 12 and at the end of the timing period the gate 112 pulses the function counter from the output F1 to the output F2. The gate 364 enters the first digit into the T10 stage of the input register 24. If the output C of the bistable circuit 66 is energized, the gate 365 transmits a decimal point count pulse to the TD stage of the input register 24 so as to move by one neon bulb to the right the decimal point displayed on the neon bulbs 17 of the visual display 14 (FIG. 1). When the decimal point is to be held at any position in the number, the operation of the gate 365 is stopped by depression of the 'decimal point' key switch The DP pulse generated by depression of the decimal point key switch 8*b* operates the gate 682 which energizes the output $\bar{C}$ of the bistable circuit 66 which inhibits the gate 365.

The gate 542 steps the slip counter 52 on one place so that the second digit will be stored in the T9 stage of the input register 24. The gate 640 transmits a pulse to the bistable circuit 62 to energize the output A so that the first digit, which is stored in the T10 stage of the input register 24, is displayed by the visual register 14. The gate 721 transmits a pulse to the bistable circuit 70 to energize the output $\bar{D}$. The gate 113 pulses the function counter 10 so that the output F0 is energized. As a result of the action of the gate 721, the gate 720 transmits a pulse to the bistable circuit 70, when the depressed first digit key on the digit keyboard 5 is released.

The entry routine of the second and subsequent digits of the number is similar to the entry routine for the first digit. The only difference is that for the entry of the second and subsequent digits the gate 115 is used in place of the gate 112 so that the function counter output F1 is not energized, and the input register 24 is not cleared. After 10 digits have been entered into the input register 24, the slip counter 52 is stepped to the count state S9. The gate 542 can only pulse the slip counter 52 only one more place before the slip counter output S11 coincides with the timer output TD and inhibits the gate 364 so that no more than the first 10 digits can enter the input register 24 and inhibits the slip to slip counter gate index 9.

A number incorrectly entered into the input register 24 is cleared by momentarily depressing and releasing the 'constant' function key switch 8*c*. The momentary depression of the 'constant' function key switch 8*c* causes the constant output $\pi$ to be energized which operated the gate 543 to pulse the slip counter 52 until the output S0 is energized. The gate 113 pulses the function counter 10 so that the output F0 is energized within the time the constant output $\pi$ is energized. If the output $\bar{C}$ of the bistable circuit 66 has been energized so as to hold the decimal point as previously described, when the function counter output F0 is energized the gate 684 pulses the bistable circuit 66 —so as to energize C which enables the gate 365. When the 'constant' function key 8*c* is released, the first and subsequent digits of the correct number with its decimal point can now be entered into the input register 24 as previously described.

In order to enter a number into the accumulator register 38 the 'constant' function key switch 8*c* is depressed and latched in the depressed position. When the constant signal $\pi$ remains energized, the modified entry operation will begin with the same initial conditions as previously described. The entry of the digits of a number into the accumulator register 38 is initiated by the depression of that key switch on the digit keyboard 5 which corresponds to the first digit of the number to be entered. The digit keyboard 5 and the gate 7 continuously transmit along the highway HW2 a train of pulses of number equal to the first digit while the corresponding digit key switch is depressed. The train of pulses along the highway HW2 pass through the gate 111 after a 10-millisecond time delay 10 from the output F0 to the output F1. The gate 363 is inhibited by the constant signal $\pi$ so that the input store 24 is not cleared.

The gate 510 clears the accumulator register 38 and the gate 585 clears the accumulator decimal point from the decimal point counter 56 during a timing period of the times circuit 12. If the output $\bar{C}$ of the bistable circuit 66 has been energized, the gate 361 circulates the number stored in the input register 24. At the end of the timing period of the timer circuit 12 the gate 112 pulses the function counter 10 from the output F1 to the output F2. During the next timing period of the timer circuit 12 the gate 503 enters the first digit into the T10 stage of the accumulator register 38. The gate 542 steps the slip counter on one place so that the second digit will be stored in the T9 stage of the accumulator register 38. The gate 584 transmits a pulse to the decimal counter 10 if the output of the bistable circuit 66 is energized. The gates 640 and 641 are both energized to pulse the bistable circuit 62 to energize the output $\bar{A}$ so that the first digit which is stored in the T10 stage of the accumulator register 38, is displayed by the visual register 14. The gates 721, 113 and 720 operate as previously described. A decimal point is normally entered into the decimal point counter 56 each time a digit is entered into the input register 24 or the accumulator register 38 by means of the gate 584; but the decimal point count can be held at any value by means of 'decimal point' key switch 8*b* and the gate 682 as previously described.

The second and subsequent digits are entered into he accumulator register 38 by a similar entry routine to that previously described for the first digit. The differences between the entry routine of the first digit and the entry routine of the second and subsequent digits when entered into the accumulator register 38 are identical to the differences which have been previously described between the entry routine of the first digit and the entry routine of the second and subsequent digits when entered into the input register 24.

A number incorrectly entered into the accumulator register is cleared by unlatching the constant function key switch 8*c* and allowing this key switch to rise to the released position before relatching this key switch. The movement of the 'constant' function key switch 8*c* from the released position to the relatched position initiates a clearing program which is identical to that clearing program previously described for clearing the input register 24.

If the 'constant' function key switch 8*c* is latched down while the 'enter' function key switch 8*a* is operated the number in the accumulator register 38 is not copied into the input register 24. If an addition or subtraction function is performed while the 'constant' function key switch 8*c* is latched down, the number in the input register will act as a constant addendum or subtrahend respectively and the answer of the addition or subtraction operation respectively is not copied into the input register 24. If the 'constant' function key switch 8*c* is latched down while a multiplication or division function is performed the number in the input register will act as a constant multiplier or divisor respectively and the answer of the multiplication or division operation respectively is not copied into the input register 24.

What we claim is:

1. A calculating machine including an input register into which digits are entered from a digit keyboard by means of a number of pulses determined in accordance with which of the keys of the keyboard are depressed, an accumulator register into which numbers are entered from the input register, a constant key which controls the input register to retain the number in the input register, and means processing the retained input register number to affect a calculation with the number in the accumulator register.

2. A calculating machine according to claim 1, wherein the calculating machine includes means for entering a digit from the digit keyboard into a digit stage of one of said means operable by the constant key in one operating position to enter a digit from the keyboard into the input register and in the other operating position to enter the digit from the keyboard into the accumulator register.

3. A calculating machine including an input register and an accumulator register, each register having a plurality of digit stages, a digit keyboard, digit entering means for entering a digit determined in accordance with which of the keys of the digit keyboard is depressed into a digit stage of one of said registers and a constant function key switch having two operating conditions and means connecting the constant switch with the digit-entering means into a circuit so that when the key switch is in one operating condition digits are entered into the input register from the keyboard when the key switch is in the other operating condition digits cannot be entered into the input register from the keyboard.

4. A calculating machine according to claim 3, wherein the digit-entering means includes means for clearing a number entered in either said register connected to the entering means and connected to the key switch including circuits operating when he key switch is moved from its initial operating position to the alternative operating position and back to its initial operating position again while said entering means is entering a number into a register then the number entered into the register after the movement of the key switch will replace the number entered into the register before the movement of the key switch.

5. A calculating machine according to claim 3, wherein the digit-entering means includes register clearing means for clearing a digit from one of said registers, and control means for controlling the register clearing means and the register entry means comprising a master oscillator; an input decade with 10 counter outputs and a shift output said decade being connected to the output of the master oscillator with means dividing the continuously generated oscillator pulses into a continuous sequence of trains of 10 pulses which appear on the 10 counter outputs respectively, each train of 10 pulses being separated from the next train of 10 pulses by a register shift pulse which appears on a shift output and means connecting the shift pulse to the input register and the accumulator register; a timer circuit having a number of count states equal to the number of digit stages in the the input register and the accumulator register, an input of the timer circuit connected to the output of the 10th pulse of the trains of 10 pulses from the input decade so that the 10th pulses cause the count states of the timer circuit to be energized in continuous sequence; a slip counter having a number of count states equal to the number of digit stages in the input register and the accumulator register, one of the count states having an output which is connected to an invertor circuit and having another of the count states energized after said one count state with an output which is connected to an invertor circuit; a function counter having a first output which is connected to an invertor circuit, a second output which is connected to the register clearing means, and a third output which is connected to the register digit entry means; a first gate whose output is connected to the input of the slip counter and whose inputs are connected to the output of the fifth pulse from the input decade, and first output of the timer circuit, the inverted other count state of the slip counter and the third output of the function counter respectively; a first bistable; a first set of gates whose output is connected to the input of the function counter the first set of gates including a first gate having inputs connected to the first output of the function counter, a second output of the timer circuit, the output of the first pulse from the input decade an output from the first bistable circuit, a time delay circuit and an input from the digit keyboard respectively, a second gate having inputs connected to the second output of the function counter, a third output of the timer circuit and the output of the 10th pulse from the input decade respectively, a third gate having inputs connected to the second output of the timer circuit, the inverted first output of the function counter circuit and a time delay circuit connected to the third output of the function counter circuit respectively, and a fourth gate having outputs connected to the second output of the function counter the second output of the timer circuit, the inverted one output of the slip counter and the output of the fifth pulse from the input decade respectively and a second set of gates whose output is connected to the input of the first bistable circuit, the second set of gates including a first gate having inputs connected to the first output of the function counter the first output of the timer circuit, the other output from the first bistable circuit, the output of the first pulse from the input decade and the inverted output from the digit keyboard respectively, and a second gate having inputs connected to the third output of the function counter the third output of the timer circuit, the output of the first pulse from the input decade and the one output of the first bistable circuit respectively; and means operable when the key on the digit keyboard corresponding to the first digit of a number is depressed and when the first output of the function counter is energized to program the first gate of the first set of gates to transmit a pulse to the function counter to energize the second output thereof so as to enable the register entry means and to enable the second gate of the second set of gates so as to energize the other output of the first bistable circuit, and to transmit by the third gate of the third set of gates after a time delay a pulse to the function counter to energize the first output thereof to energize the first gate of the second set of gates so as to transmit a pulse to energize the one output of the first bistable circuit; and means operable when the key corresponding to second and subsequent digits are depressed on the keyboard to repeat the program with the fourth gate of the second set of gates energized before the second gate of the second set of gates so that the register clearing means is not enabled.

6. A calculating machine according to claim 5, wherein the constant function key switch includes means when releasably held in the one operating condition to generate a signal of one voltage level along a line and when releasably held in the other operating condition to generate a signal of another voltage level along the line.

7. A calculating machine according to claim 6, wherein the input register and the accumulator register each include a shift register buffer connected to the register so as to form an endless loop for circulating the digits of the number stored in the register; and wherein the input register and the accumulator register each include a carry store including a first bistable circuit whose output is connected to the output of the respective buffer, which output is energized when a digit of predetermined value is stored in the shift register buffer; whereby, when a digit not of the predetermined value is circulated into the shift register buffer, the one output of the carry store first bistable is energized; and whereby when a digit of the predetermined value is circulated into the shift register buffer, the other output of the carry store bistable circuit is energized.

8. A calculating machine according to claim 7, wherein the register clearing means includes a first gate of a fourth set of gates having an output connected to the input of the shift register buffer of the input register having inputs connected to the second output of the function counter, the one output of the carry store first bistable circuit of the input register and the inverted output of the one operating condition of the constant function key switch respectively and a first gate of a fifth set of gates having an output connected to the input of the shift register buffer of the accumulator register having inputs connected to the second output of the function counter, the one output of the carry store first bistable circuit of the accumulator register, the output of the one operating condition of the constant function key switch and the inverted output of the second output of the timer circuit respectively; and wherein the register digit entry means includes a second gate of the fourth set of gates having inputs connected to the third output of the function counter, the trains of 10 pulses of the input decade the other count state of the slip counter, the output of the digit keyboard, the inverted output of one operating condition of the constant function key switch and the inverted first output of the timer circuit respectively, and a second gate of the fifth set of gates having inputs connected to the third output of the function counter, the other count state of the slip counter, the trains of 10 pulses of the input decade, the line of the digit keyboard, and the output of the one operating condition of the constant function key switch respectively; and means connecting the circuits so as when the constant key switch is held at the one operating condition, the first gate of the fourth set of gates clears the number in the input register and the first gate of the fifth set of gates enters a number into the input register; and when the constant key is held at the other operating condition, the second gate of the fourth set of gates clears the number in the accumulator register and the second gate of the fifth set of gates enters a number into the accumulator register.

9. A calculating machine according to claim 8, wherein the calculating machine further includes a means for entering a decimal point and a means for clearing a decimal point; and wherein the decimal point entering means includes a decimal point function key switch, a second bistable circuit, a first gate having an output connected to the second bistable circuit and having inputs connected to the first output of the function counter, the decimal point function key switch, the output of the 10th pulse from the input decade and one output of the second bistable circuit respectively, a third gate of the fourth set of gates, the third gate having input connected to the third output of the function counter, the first output of the timer circuit, the output of the 10th pulse from the input decade, the one output of the second bistable, the inverted output of the one operating condition of the constant function key switch and the inverted other count state of the slip counter respectively, a decimal counter for storing the decimal point count of the accumulator register, the decimal counter having an output when the decimal point count is zero, and a sixth set of gates having the output connected to the input of the decimal counter, the first gate of the sixth set of gates having inputs connected to the third output of the function counter, the first output of the timer circuit, the output of the 10th pulse from the input decade, the one output of the second bistable circuit, the output of the one operating condition of the constant function key switch and the inverted other count state of the slip counter respectively; and wherein the decimal point clearing means comprises the decimal point function key switch, the second bistable circuit, the first gate connected to the input of the second bistable circuit, the first gate of the fourth set of gates and a second gate of the sixth set of gates, the second gate having inputs connected to the second output of the function counter, the first output of the timer circuit, the inverted output of the decimal point decimal counter and the output of the one operating condition of the constant function key switch respectively; and control circuits operable when the decimal point function key switch is not operated to transmit a signal along the output thereof, the decimal point in the input register and the accumulator register before the entry of the first digit are cleared by the first gate of the fourth set of gates and the second gate of the sixth set of gates respectively, and decimal point pulses are added at the entry of each digit into the input register and the accumulator register respectively by the third gate of the fourth set of gates and the first gate of the sixth set of gates respectively; and when the decimal point function key switch is operated to transmit a signal along the output thereof, the entry of decimal point pulses into the input register and the accumulator register respectively are inhibited by the operation of the first gate connected to the second bistable so as to change the output of the second bistable so as to inhibit the third gate of the fourth set of gates and the first gate of the sixth set of gates.

10. A calculating machine according to claim 9, including number-correcting means comprising a second gate whose output is connected to the input of the slip counter and whose inputs are connected to the second output of the timer circuit the inverted one count state of the slip counter, the output of the one operating condition of the constant function key switch and the output of a time delay connected to the inverted output of the one operating condition of the constant function key switch respectively; a second gate whose output is connected to the input of the second bistable circuit and whose inputs are connected to the first output of the function counter circuit the output of the one operating condition of the constant function key switch and the output of a time delay connected to the inverted output of the one operating condition of the constant function key switch respectively and the third gate of the first set of gates; and control means operable when during the entry of digits the constant key switch is moved from its initial operating position to the alternative operating position and back to its initial operating position, the second gate connected to the slip counter pulses the slip counter back to the position required for entry of a first digit, the third gate of the first set of gates the function counter so that the first output is energized and the second gate connected to the second bistable ensures that the one output of the second bistable circuit is energized so that the decimal point count is cleared at the entry of a first digit.

11. A calculating machine according to claim 10, wherein the calculating machine includes means for retaining the number stored in the input register, said retaining means comprising the second bistable circuit, the first gate connected to the input of the second bistable circuit and a fourth gate of the fourth set of gates, the fourth gate having inputs connected to the second output of the function counter, the one operating condition of the constant function key switch, the inverted second output of the timer circuit and the other output of the second bistable circuit respectively; and means operable when the constant function key switch is held in the other operating condition, the fourth gate of the fourth set of gates circulates the number stored in the input register so as to retain the circulated number in the input register.

12. A calculating machine according to claim 11, wherein the calculating machine includes a means for displaying the numbers entered into a register from the digit keyboard, the displaying means comprising a number tube display device, a first connection means connected from the carry store of the input register to the display device, a second connection means connected from the carry store of the accumulator register to the display device, a third bistable circuit having one output controlling the operation of the first connection means and another output controlling the operation of the second connection, and a seventh set of gates connected to the third bistable circuit, the first gate of the seventh set of gates having inputs connected to the third output of the function counter, the second output of the timer circuit, the output of the first pulse from the input decade, and the one output of the third bistable circuit respectively, and the second gate of the seventh set of gates having inputs connected to the third output of the function counter, the third output of the timer circuit, the output of the first pulse from the input decade, the one output from the third bistable circuit and the output of the one operating condition of the constant function key switch respectively; and means operable when the constant function key switch is held in the one operating condition so that the first gate of the seventh set of gates causes the third bistable circuit to enable the first connection means so that the number stored in input register is displayed on the number tube display device and when the constant key switch is held in the other operating condition, the second gate of the seventh set of gates causes the third bistable circuit to enable the second connection means so that the number stored in the accumulator register is displayed on the number tube display device.

* * * * *